United States Patent
Su et al.

(10) Patent No.: US 12,416,287 B2
(45) Date of Patent: Sep. 16, 2025

(54) METHOD AND APPARATUS FOR CONTROLLING POWER OF WIND FARM

(71) Applicant: BEIJING GOLDWIND SCIENCE & CREATION WINDPOWER EQUIPMENT CO., LTD., Beijing (CN)

(72) Inventors: Huili Su, Beijing (CN); Pengfei Zhang, Beijing (CN); Yuxia Mi, Beijing (CN); Shipei Zhao, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/563,578

(22) PCT Filed: Mar. 25, 2022

(86) PCT No.: PCT/CN2022/082952
§ 371 (c)(1),
(2) Date: Nov. 22, 2023

(87) PCT Pub. No.: WO2023/092915
PCT Pub. Date: Jun. 1, 2023

(65) Prior Publication Data
US 2024/0263613 A1    Aug. 8, 2024

(30) Foreign Application Priority Data

Nov. 29, 2021    (CN) .......................... 202111436105.8

(51) Int. Cl.
*F03D 7/02*     (2006.01)
*F03D 7/04*     (2006.01)
*H02J 3/46*     (2006.01)

(52) U.S. Cl.
CPC ............. *F03D 7/028* (2013.01); *F03D 7/048* (2013.01); *H02J 3/46* (2013.01);
(Continued)

(58) Field of Classification Search
CPC ......... H02J 3/46; H02J 2300/28; F03D 7/028; F03D 7/048; F05B 2270/1033; F05B 2270/20
(Continued)

(56) References Cited

U.S. PATENT DOCUMENTS 8,108,080 B2 *   1/2012   Wakata .................... A61P 31/14
                                                                290/55
8,633,607 B2 *   1/2014   Egedal .................... F03D 7/048
                                                                290/44
(Continued)

FOREIGN PATENT DOCUMENTS

CN    102852721 A    1/2013
CN    105515061 A    4/2016
(Continued)

OTHER PUBLICATIONS

Wei Yuan, et al; "Wind farm active power control strategy research based on generating cost and fatigue uniformity", Renewable Energy Resources, vol. 35, No. 12; Dec. 2017, 7 pages *English abstract at end of publication*.
(Continued)

*Primary Examiner* — Hal Kaplan

(57) ABSTRACT

The present disclosure provides a method and an apparatus for controlling power of a wind farm. The method includes: acquiring a historical equivalent fatigue load of a target component of each of a plurality of wind turbines; acquiring an entire fatigue load, an equivalent fatigue load of the target component and a pay per unit power generation of each of the plurality of wind turbines at a current moment; deter-
(Continued)

mining an optimal power value for at least one of the wind turbines according to the historical equivalent fatigue load, as well as the entire fatigue load, the equivalent fatigue load, and the pay per unit power generation; and adjusting a power value of the at least one of the wind turbines to the optimal power value for the wind turbine.

20 Claims, 3 Drawing Sheets

(52) U.S. Cl.
CPC ... *F05B 2270/1033* (2013.01); *F05B 2270/20* (2013.01); *H02J 2300/28* (2020.01)

(58) Field of Classification Search
USPC .......................................................... 307/24
See application file for complete search history.

(56) References Cited

U.S. PATENT DOCUMENTS

| | | | |
|---|---|---|---|
| 11,506,174 B2 * | 11/2022 | Yu | F03D 7/043 |
| 2011/0140428 A1 | 6/2011 | Wakata et al. | |
| 2015/0275860 A1 | 10/2015 | Carcangiu et al. | |

FOREIGN PATENT DOCUMENTS

| | | |
|---|---|---|
| CN | 108869173 A | 11/2018 |
| CN | 112260325 A | 1/2021 |
| CN | 113078690 A | 7/2021 |
| CN | 113361083 A | 9/2021 |
| CN | 113394813 A | 9/2021 |
| CN | 113659630 A | 11/2021 |
| KR | 20210126207 A | 10/2021 |

OTHER PUBLICATIONS

Yunqi Xiao, et al; "Power-limited Operation Characteristic Analysis and Optimal Scheduling for Large Scale Wind Turbines", Automation of Electric Power Systems, vol. 38, No. 20; Oct. 25, 2014 9 pages English Abstract last page*.
Ben Zhang, et al; "Control strategies for active power of wind farm based on fatigue distribution", Yangtze River, vol. 47, No. 9; May 2016; 6 pages *English Abstract on last page*.
The International Search Report mailed Aug. 12, 2022; PCT/CN2022/082952.
Haoran Zhao, et al.: "Fatigue Load Sensitivity-Based Optimal Active Power Dispatch For Wind Farms", IEEE Transactions on Sustainable Energy, vol. 8, No. 3, Jul. 2017; 13 pages; XP11653300A.
Qi Ya0, et al; "Optimized Active Power Dispatching Strategy Considering Fatigue Load of Wind Turbines During De-Loading Operation", IEEEAccess. vol. 7,2019; 11 pages; XP11709208A.
Baohua Zhang, et al; "A Wind Farm Active Power Dispatch Strategy for Fatigue Load Reduction", 2016 American Control Conference (ACC) Boston Marriott Copley Place Jul. 6-8, 2016. Boston, MA, USA; 6 pages; XP32933607A.
Qihang Li, et al; "Coordinative Optimization on Fatigue Distribution and Active Power in Wind Farms", 2016 International Symposium on Electrical Engineering (ISEE), 2016•ieeexplore.ieee.org; 6 pages; XP33061190A.
Qi Yao, et al; "Optimization of Active Power Dispatching Considering Lifetime Fatigue Load for Offshore Wind Farm Based on Multi-agent System", IECON 2019—45th Annual Conference of the IEEE Industrial . . . , 2019•ieeexplore.ieee.org; 6 pages; XP33669608A.
The Extended European Search Report dated Aug. 13, 2024; Appln. No. 22897016.6.
The First Chinese Office action dated Mar. 4, 2025; Appln. No. 202111436105.8.

\* cited by examiner

METHOD AND APPARATUS FOR CONTROLLING POWER OF WIND FARM

This application is a National Stage of International Application No. PCT/CN2022/082952, filed Mar. 25, 2022, which claims the benefit of and priority to Chinese Application No. 202111436105.8, filed Nov. 29, 2021, the entireties of which are hereby incorporated herein by reference.

TECHNICAL FIELD

The present disclosure relates to the field of wind power generation, and more particularly to a method and an apparatus for controlling power of a wind farm.

BACKGROUND

Due to complexity in terrain of a wind farm, high fluctuation in distribution of wind resources, poor predictability, and a limited transmission capacity of a power grid in some areas, it is normal for the wind farm to operate under a limited power, which requires decrease in overall output power of the wind farm over a period. Meanwhile, during operation under the limited power, an output state of a wind turbine in the wind farm can be actively regulated to improve quality of wind power so as to ensure smooth and controllable power generation of the wind farm while reducing a negative impact on operation and economic benefits of the wind turbines. Accordingly, this becomes one of popular and difficult subjects under study in the industry.

At present, a common practice in an operating wind farm is to select several wind turbines from a plurality of wind turbines which are operating in the wind farm to stop them upon reception of a power limiting instruction from the power grid, so as to meet a limited power value. Although some simple strategies such as proportional allocation, equal allocation and starting and stopping particular wind turbines are studied in the industry, overall economic benefits of the wind farm still need to be improved.

SUMMARY

Therefore, adjusting operation power of a wind turbine in the wind farm appropriately in response to a power limiting instruction is very important to improve overall economic benefits of the wind farm.

In one general aspect, a method for controlling power of a wind farm is provided, and the method for controlling power includes: acquiring a historical equivalent fatigue load of a target component of each of a plurality of wind turbines in the wind farm during a target historical period; acquiring, in response to entering a limited power cycle, an entire fatigue load, an equivalent fatigue load of the target component and a pay per unit power generation of each of the plurality of wind turbines at a current moment, wherein the pay per unit power generation of a wind turbine is obtained based on the equivalent fatigue load and power generation of the wind turbine; determining an optimal power value of at least one of the wind turbines according to the historical equivalent fatigue load as well as the entire fatigue load, the equivalent fatigue load and the pay per unit power generation, to ensure that a sum of power values of the plurality of wind turbines is less than or equal to a limited power value in the limited power cycle; and sending a control instruction to the at least one of the wind turbines to adjust a power value of the at least one of the wind turbines to the optimal power value for the wind turbine.

In another general aspect, an apparatus for controlling power of a wind farm is provided, and the apparatus for controlling power includes: an acquisition unit configured to acquire acquiring a historical equivalent fatigue load of a target component of each of a plurality of wind turbines in the wind farm during a target historical period; the acquisition unit is further configured to acquire, in response to entering a limited power cycle, an entire fatigue load, an equivalent fatigue load of the target component and a pay per unit power generation of each of the plurality of wind turbines at a current moment, wherein the pay per unit power generation of a wind turbine is obtained based on the equivalent fatigue load and power generation of the wind turbine; a determination unit configured to determine an optimal power value of at least one of the wind turbines according to the historical equivalent fatigue load as well as the entire fatigue load, the equivalent fatigue load and the pay per unit power generation, to ensure that a sum of power values of the plurality of wind turbines is less than or equal to a limited power value in the limited power cycle the entire fatigue load; and a controlling unit configured to send a control instruction to the at least one of the wind turbines to adjust a power value of the at least one of the wind turbines to the optimal power value for the wind turbine.

In another general aspect, there is provided a computer readable storage medium storing instructions, which, when executed by at least one processor, cause the at least one processor to perform the method for controlling power.

In another general aspect, a computer device is provided, and the computer device includes at least one processor, and at least one memory storing computer-executable instructions, wherein the computer-executable instructions, when executed by the at least one processor, cause the at least one processor to perform the method for controlling power.

It should be understood that the above general description and the following detailed description are merely exemplary and explanatory, and are not intent to limit the present disclosure.

DETAILED DESCRIPTION

Figure 1:
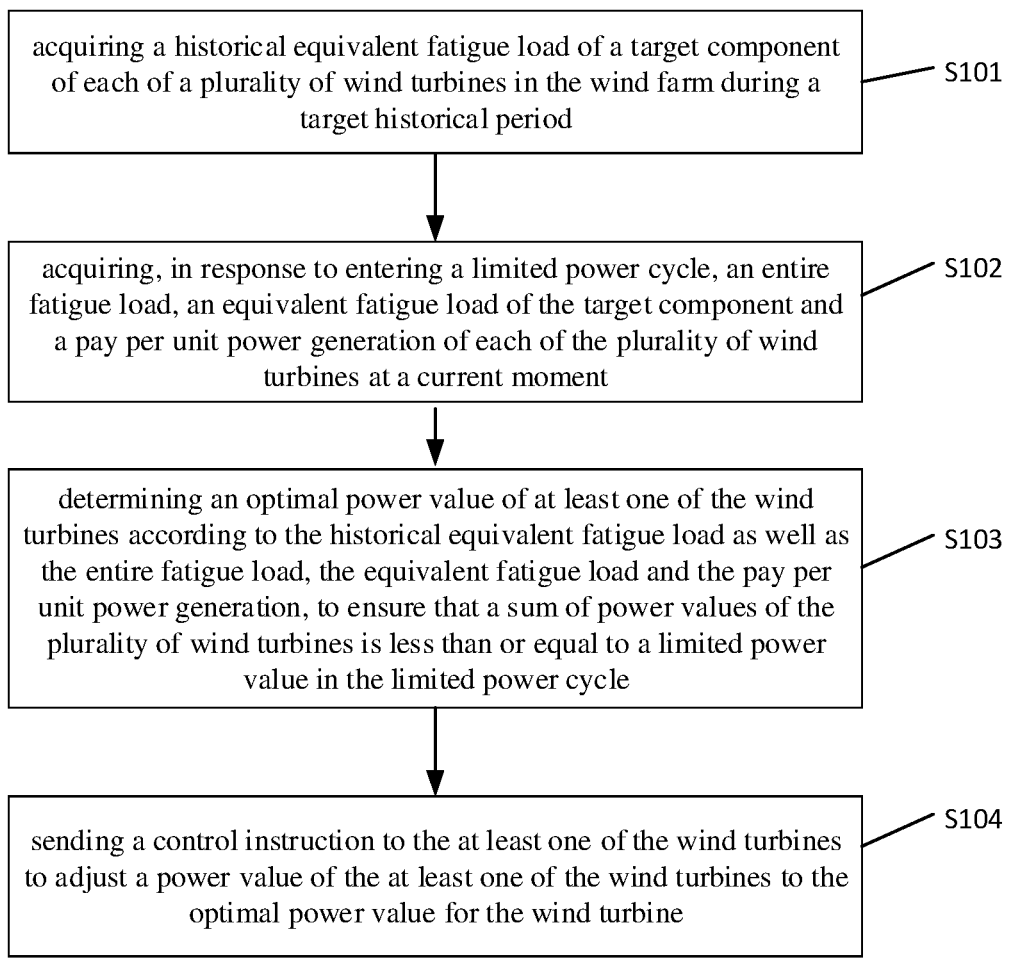
FIG. 1 is a flowchart showing a method for controlling power of a wind farm according to embodiments of the present disclosure.

Specific implementations are provided below to assist a reader in obtaining a thorough understanding of a method, an apparatus and/or a system described herein. However, various changes, modifications, and equivalents of the method, the apparatus, and/or the system described herein will be apparent with understanding of the disclosure of the present application. For example, the sequence of operations described herein is merely an example, and the present application is not limited thereto. Further, except for operations that must be executed in a particular sequence, other operations may be occurred in a changed sequence as what will be apparent with the understanding of the disclosure of the present application. Moreover, for sake of clarity and brevity, descriptions of features known in the art may be omitted.

The features described herein may be implemented in various forms and should not be construed as being limited to those examples described herein. Rather, examples described herein have been provided to illustrate only some of many feasible ways used for implementing the method, the apparatus, and/or the system described herein, and theses feasible ways will be apparent with the understanding of the disclosure of the present application.

As used herein, terms "and/or" include any one, two, or more combinations of associated listed items.

Although terms such as "first", "second", and "third" are used herein to describe various parts, components, areas, layers, or portions, these parts, components, areas, layers, or portions should not be limited by these terms. Rather, these terms are only used to distinguish one part, one component, one area, one layer or one portion from the other part, the other component, the other area, the other layer or the other portion. Therefore, a first part, a first component, a first area, a first layer, or a first portion referred to in examples described herein may also be referred to as a second part, a second component, a second area, a second layer, or a second portion without departing from the teaching of the examples.

In the specification, when an element such as a layer, an area or a substrate is described as being "on", "connected to" or "bonded to" another element, the element may be directly "on", "connected to" or "bonded to" the another element, or there may be one or more other elements therebetween. In contrast, when an element is described as being "directly on", "directly connected to" or "directly bonded to" another element, there may be no other elements therebetween.

All the terms used herein are only used for describing various examples and not used for limiting the disclosure. Unless otherwise clearly indicated, a singular form is intended to include a plural form. Terms "comprising", "including", and "having" indicate presence of stated features, amounts, operations, components, elements, and/or combinations thereof, but do not preclude presence or addition of one or more other features, amounts, operations, components, elements, and/or combinations thereof.

Unless otherwise defined, all of terms (including technical and scientific terms) used herein have the same meaning as commonly understood by a person skilled in the art to which this disclosure belongs after the person understands the present disclosure. Unless otherwise expressly defined herein, some terms (such as those defined in commonly used dictionaries) in the present disclosure should be construed as having a meaning that is consistent with their meaning in context in the related art, and should not be construed in an idealized or overly formal sense.

Further, in the description of the examples, detailed descriptions of well-known related structures or functions will be omitted when it is considered that such detailed descriptions would obscure the disclosure.

Figure 2:
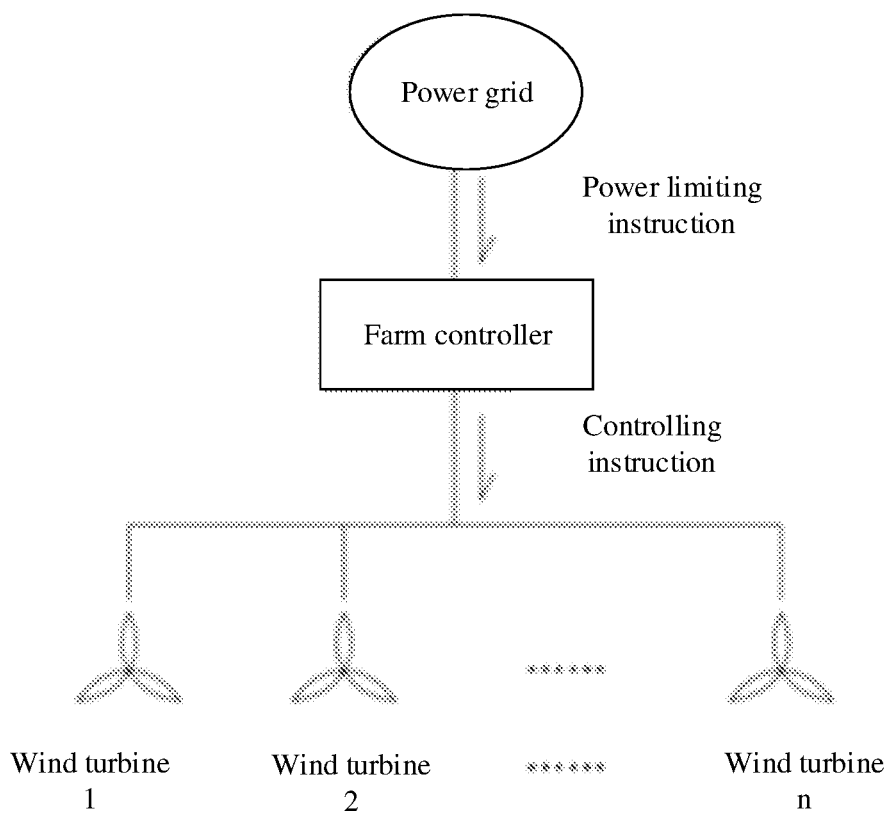
FIG. 2 is a schematic view showing a controlling scenario for a power grid and a wind farm according to embodiments of the present disclosure.
Figure 3:
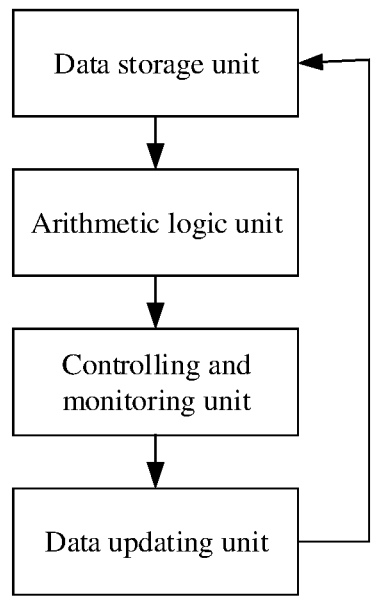
FIG. 3 is a flowchart showing a system for controlling power of a wind farm according to embodiments of the present disclosure.

FIG. 1 is a flowchart showing a method for controlling power of a wind farm according to embodiments of the present disclosure. The method for controlling power may be performed by a farm controller of the wind farm. FIG. 2 is a schematic view showing a controlling scenario for a power grid and a wind farm according to embodiments of the present disclosure. Specifically, the method for control-ling power may be achieved by a system for controlling power of a wind farm. FIG. 3 is a flowchart showing a system for controlling power of a wind farm according to embodiments of the present disclosure.

Referring to FIG. 1, in step S101, a historical equivalent fatigue load of a target component of each of a plurality of wind turbines in the wind farm during a target historical period is acquired.

According to the embodiments of the present disclosure, the target component is a component of the wind turbine, such as a turbine head, a blade, a tower top, a tower bottom, and the like, from which at least one of these components may be selected according to a degree of attention paid by the wind farm on the respective components. It should be understood that though a plurality of solutions may be provided for selecting the target component, it requires to keep the selected target component to be the same for a same round of power control.

The target historical period may be an entire period for a wind turbine from a moment where the wind turbine is put into use to a current moment, so as to obtain the fatigue load consumption of the target component of the wind turbine more accurately. It should be noted that, the fatigue load is generally an alternating load, that is, a force direction is being changed continuously. Most typically, for example, the load may be positive or negative, and a load curve is just like a sine curve, and some part (corresponding to the target component, such as gears) in practical applications is generally subjected to the fatigue load because the turbine is operating continuously. The fatigue load refer to loads on the target component from a moment at which the target component is put into use to a current moment. Under a condition that the loads reach a certain extent (such as a predetermined rated load), the target component is damaged, that is, under a condition that the consumed fatigue load reaches the certain extent, the target component is damaged. It should be noted here that, the fatigue load over a period is determined in a specific manner, for example, determined through an equivalent fatigue load output by a preset model, which will be discussed in detail below and is not discussed here.

For operation of the wind farm under a limited power, referring to FIG. 2, the power grid often sends a power limiting instruction to the farm controller in the wind farm in advance, wherein the power limiting instruction includes a limited power cycle and a limited power value, that is, an overall output power value of a wind farm which who receives the instruction is required to not exceed the limited power value in a certain future period. Since the target historical period is generally relatively long and there may involve a large amount of data, so upon reception of the power limiting instruction, it prepares to acquire data to obtain the historical equivalent fatigue load. It should be understood that, during a period from the moment at which the power limiting instruction is received to a moment at which the limited power cycle starts, if the wind turbine continues to operate, equivalent fatigue load for the period also should be calculated and included in the historical equivalent fatigue load. It should be noted that, the equivalent fatigue load refer to load subjected by the target component during a period which is set according to user's needs, and the equivalent fatigue load may be obtained by the preset model, which is discussed in detail below and is not discussed here.

According to the embodiments of the present disclosure, the historical equivalent fatigue load may be obtained by inputting operation data of each of the plurality of wind turbines during the target historical period into a preset model trained by machine learning. Since the operation data is data collected during daily operation of the wind farm, no additional device is required, so optimization cost of the power control may be reduced. In addition, the operation data is data actually detected for the wind turbines, there is high reliability, thereby ensuring accuracy of the obtained historical equivalent load.

Specifically, the target historical period may be divided into a plurality of sub-periods, operation data for the respective sub-periods may be input into the preset model to obtain equivalent fatigue loads corresponding to the respective sub-periods, and a sum of these equivalent fatigue loads may be calculated as the historical equivalent fatigue load. Specifically, the operation data for the wind turbine may be supervisory control and data acquisition (SCADA, that is, a supervisory control and data acquisition system) data, wherein the system may monitor condition of the wind turbines, and start and stop the wind turbines in the whole wind farm, by including large-scale monitoring software and an improved communication network. The operation data input into the preset model may include a power value, a power generation capacity, a rotor speed, a generator torque, a component of nacelle acceleration along a direction x, and a component of the nacelle acceleration along a direction y, a pitch angle, and the like. Of course, the data are merely examples, and may selected specifically depending on a selected target component. A suitable model and a suitable training method for machine learning may be selected for the preset model and its specific training method, which is not limited by the present disclosure.

Referring to FIG. 3, the step S101 may be performed by a data storage unit, and the data storage unit may specifically store the equivalent fatigue loads output by the preset model in various periods.

Referring back to FIG. 1, in step S102, in response to entering a limited power cycle, an entire fatigue load, an equivalent fatigue load of the target component and a pay per unit power generation of each of the plurality of wind turbines at a current moment are acquired, wherein the pay per unit power generation of a wind turbine is obtained based on the equivalent fatigue load and power generation of the wind turbine. These data may reflect operation condition of the wind turbine, and may be used subsequently in step S103 to determine a suitable optimal power value for the wind turbine, thereby improving economic benefits of the wind farm. It should be understood that, the current moment here is theoretically a starting moment to of the limited power cycle, but depending on accuracy of a system, there may be a margin of errors in an actual operation, which still fall within the protection scope of the present disclosure.

According to the embodiment of the present disclosure, the entire fatigue load may be obtained based on a wind resource parameter at the current moment, which takes an effect of the wind resource on an entire wind turbine into consideration, thereby reflecting operation condition of the wind turbine as a whole.

Optionally, the wind resource parameter may include statistical values of turbulence intensity under a plurality of wind speeds, probability densities of the plurality of respective wind speeds, and probability densities of a plurality of wind directions corresponding to the plurality of respective wind speeds, and wherein the entire fatigue load is obtained by accumulating the statistical values of turbulence intensity on a dimension of wind speed and a dimension of wind direction. The turbulence intensity is equal to a ratio of a standard deviation of the wind speeds to an average of the wind speeds, and describes how the wind speed changes as time and space changes, thereby reflecting relative intensity of a fluctuating wind speed. Therefore, the turbulence intensity embodies the effect of wind, and is a main parameter for measuring the entire fatigue load. Furthermore, the wind acting on different wind turbines may have different wind speeds, each wind speed has its probability density, and the wind blows from a certain direction, so a wind direction also has its probability density, and different wind directions have different effects on different wind turbines. By accumulation of the statistical values of the turbulence intensity on the dimension of wind speed and the dimension of wind direction may reflect effects of the wind speed and the wind direction, so that the obtained entire fatigue load can reflects an effect of wind on the wind turbine more accurately.

Specifically, the statistical value of the turbulence intensity may be a standard deviation of turbulence intensity, and the standard deviation of the turbulence intensity under a wind speed $Wsp_j$ may be represented as $\sigma_1(Wsp_j)$, in which the entire fatigue load $f_{indicator,t}$ at a current moment t may be obtained by: determining, for each of the wind turbines and for each of the wind speeds, a product of an m-th power of a standard deviation $\sigma_1(Wsp_j)$ of turbulence intensity under a wind speed, a probability density $pdf(Wsp_j)$ of the wind speed, and a probability density $pdf(Dir_j)$ of a corresponding wind direction, and determining a sum of the products as a reference load, wherein m is a material Wolter coefficient of the wind turbine and determining a (1/m)-th power of the reference load as the entire fatigue load of the wind turbine. That is:

$$f_{indicator,t} = \left(\sum_{j=1}^{N} (\sigma_1(Wsp_j))^m \times pdf(Wsp_j) \times pdf(Dir_j)\right)^{\frac{1}{m}}$$

According to the embodiments of the present disclosure, the calculation of the equivalent fatigue load of the target component may be referred to the way of calculating the historical equivalent fatigue load in step S101, that is, it may be done by: inputting the operation data of the wind turbine at the current moment into the preset model to obtain the equivalent fatigue load of the target component at the current moment. It should be noted that, the equivalent fatigue load of the target component at the current moment may be regarded as an equivalent fatigue load during a period of 0. In general, in order to ensure continuity of the operation data, operation data during a period from a moment at which the equivalent fatigue load was last calculated to the current moment may be obtained, and used for calculating the equivalent fatigue load at the current moment.

According to the embodiments of the present disclosure, the pay per unit power generation at the current moment is a ratio of the equivalent fatigue load of the target component at the current moment to the power generation of the wind turbine at the current moment, and represents an equivalent fatigue load consumed for generating a unit amount of power. The generated amount of power is used as the operation data, and may be obtained directly.

Referring to FIG. 3, in step S102, the operation of acquiring the equivalent fatigue load may be performed by the data storage unit, and the operation of acquiring the entire fatigue load and the pay per unit power generation may be performed by an arithmetic logic unit.

Referring to FIG. 1, in step S103, an optimal power value of at least one of the wind turbines is determined according to the historical equivalent fatigue load as well as the entire fatigue load, the equivalent fatigue load and the pay per unit power generation, to ensure that a sum of power values of the plurality of wind turbines is less than or equal to a limited power value corresponding to the limited power cycle. The historical equivalent fatigue load, the entire fatigue load, the equivalent fatigue load, and the pay per unit power generation may reflect the operation condition of the wind turbine. By combining these parameters, at least one of the wind turbines is selected, and its optimal power value, that is, a target power value a user wants is specifically determined. The target power value enables losses of the wind turbines in the wind farm to be balanced as much as possible while satisfying the power limiting instruction, so as to ensure a uniform maintenance cycle and reduce operation and maintenance costs for the wind farm and losses of the wind turbines, thereby improving overall economic benefits of the wind farm. It should be understood that, each wind turbine in the wind farm has its current actual power value, so for the selected wind turbine, its power value may be replaced by the optimal power value. The purpose of the adjustment in the step S103 is that a sum of power values of all the wind turbines after the replacement is less than or equal to the limited power value.

According to the embodiments of the present disclosure, the step S103 may specifically include: determining, for the plurality of wind turbines, the optimal power value according to the historical equivalent fatigue load as well as the entire fatigue load, the equivalent fatigue load and the pay per unit power generation on a basis of a wind turbine and in an order of the entire fatigue load from largest to smallest, until the sum of the power values of the plurality of wind turbines is less than or equal to the limited power value (before adjustment of the power values, a sum of power values of all of the wind turbines in the wind farm is usually greater than the limited power value; if the sum is less than or equal to the limited power value, the adjustment is not required, and initial power values are maintained).

In other words, for the adjustment, an optimal power value (correspondingly marked as $p_{opti,k}$) of a wind turbine (for example, marked as $Turbine_k$) with a maximum entire fatigue load is determined firstly, and then it is determined whether the sum of the power values of the plurality of wind turbines is less than or equal to the limited power value. If the sum of the power values of the plurality of wind turbines is still greater than the limited power value, a wind turbine with a maximum entire fatigue load is then selected from those wind turbines whose power values have not been adjusted yet, and an optimal power value of the selected wind turbine is determined. This process is repeated until the sum of the power values is less than or equal to the limited power value, and at this time, the power limiting instruction is satisfied, so those wind turbines whose power values have not been adjusted may maintain their power values as initial ones.

The entire fatigue load reflects operation condition of the entire wind turbine. By determining an adjustment priority for the wind turbine based on the entire fatigue load (that is, the greater the parameter is, the higher the priority is), a wind turbine carrying a relatively great fatigue load from the perspective of the whole wind farm can be preferentially selected, and its power value and in turn its entire fatigue load can be reduced, such that the entire fatigue loads of the respective wind turbines are consumed as uniformly as possible. On the other hand, based only on this parameter, an operation state of each of the wind turbines in the wind farm can be evaluated rapidly, and then a priority of applying a power limiting strategy for the wind turbines may be determined based on results of the evaluation, thereby expediting satisfaction of the power limiting instruction.

It should be understood that, the priority here includes a priority of a wind turbine in the wind farm and a priority of an operating mode of the wind turbine. That is, from the perspective of the wind farm, the greater the entire fatigue load of the wind turbine is, the higher the priority for the wind turbine operates in a limited power is; and from the perspective of a the wind turbine, the greater the entire fatigue load is, the higher the priority of a power limiting mode is, and the lower the priority of a normal power generation mode is.

Optionally, for a selected target wind turbine (as the selection as discussed above, it is the wind turbine with the maximum entire fatigue load among the wind turbines whose power values have not been adjusted), its optimal power value is selected from a plurality of alternative preset power values. Compared with calculating an optimal power value directly according to the parameters, this may greatly reduce difficulty in solving the value, and is helpful for improving calculation efficiency, thereby expediting satisfaction of the power limiting instruction from the power grid. Accordingly, before the step S103, a set of preset power values for a target wind turbine among the plurality of wind turbines is acquired, and the set of preset power values is traversed, an equivalent fatigue load and power generation of the target wind turbine at the current moment is re-determined according to the respective preset power values, and the pay per unit power generation is re-determined according to the equivalent fatigue load and the power generation. Since the power value is a piece of operation data, and will affects power generation, so when the power value changes, the equivalent fatigue load and the power generation will change accordingly. By re-determining the equivalent fatigue load and the power generation according to the preset power value, it is possible to understand that a change that occurs when a corresponding preset power value is determined as the optimal power value, and take it as a basis for selecting an appropriate preset power value in the step S103.

It should be understood that, a set of preset power values for a current target wind turbine may be obtained on a basis of wind turbine, or sets of preset power values for several wind turbines with relatively greater entire fatigue loads may be obtained at one time, or sets of preset power values s for all of the wind turbines may be obtained at one time for use later, which are implementations of the present disclosure and fall within the protection scope of the present disclosure.

The preset set of power values may, for example, include a plurality of preset power values which are obtained from a full power value of the target wind turbine subtracted gradually by a preset value, wherein a minimum one of the set of preset power values is greater than or equal to 0. Taking that the preset difference is equal to 50 KW, the full power value is p, and the minimum preset power value in the set of preset power values is equal to 0 as an example, the set of preset power values may be represented as $p_{set,i}=\{p, p-50, p-100, \ldots, 100, 50, 0\}$, in which the i represents a serial number of the wind turbines. By the embodiment, the preset power values may be selected uniformly, and the difference value may be selected appropriately according to different accuracy requirements in an actual operation. It should be understood that, if the minimum preset power value in the set of preset power values is equal to 0, it represents that the target wind turbine should stop operating, and if the minimum preset power value in the set of preset power values is greater 0, it represents that the target wind turbine should not stop operating, so a minimum power value (such as p−1000) may be defined for the wind turbine, thereby achieving flexible control.

Accordingly, the step S103 may include: determining reference indexes corresponding to the respective preset power values at the current moment, wherein the reference indexes comprises the entire fatigue load, the pay per unit power generation, and a difference between a consumed fatigue load and an average value of consumed fatigue loads of the plurality of wind turbines (referred to as fatigue difference hereinafter), and wherein the consumed fatigue load is a sum of the historical equivalent fatigue load, the equivalent fatigue load and the entire fatigue load; and selecting, based on the reference indexes, one of the set of preset power values as the optimal power value, such that the reference indexes corresponding to the optimal power value are all less than the respective reference indexes corresponding to at least a part of other preset power values among the set of preset power values.

By selecting the three reference indexes, and taking a preset power value with reference indexes which are less than reference indexes corresponding to at least a part of other preset power values as the optimal power value, the reference indexes of the optimal power values are relatively smaller, so as to reduce consumption of the wind turbine and improve overall economic benefits of the wind farm.

Specifically, the smaller the entire fatigue load is, the smaller the damage to the wind turbine is; the smaller the pay per unit power generation is. The smaller the equivalent fatigue load consumed for generating unit amount of power is, costs of the wind turbine for power generation can be reduced, and economic benefits of the wind turbine can be improved; the smaller the fatigue deviation is, the more uniform the consumed fatigue load of the wind turbines in the wind farm tends to be, and the closer the degree of fatigue abrasion of the wind turbines is, so as to ensure a uniform maintenance cycle and reduce operation and maintenance costs for the wind farm and losses of the wind turbines. If the above discussed reference indexes can reach minimum values at the same time, the economic benefits of the wind farm can be improved significantly, but under this condition the calculation is relatively difficult, and an exact solution even cannot be obtained. By defining the reference indexes to be less than reference indexes corresponding to at least a part of other preset power values (rather than all other preset power values), t each of reference indexes may be relatively smaller, thereby not only economic benefits of the wind farm can be fully improved, but also solving difficulty can be reduced and response efficiency can be improved, which facilities reduction of costs and satisfaction of the power limiting instruction from the power grid rapidly.

Specifically, the entire fatigue load $f_{indicator}$ reaching a minimum value may be represented as:

$$\min_{it} f_{indicator,it}$$

where the i still represents the serial number of the wind turbines, and the t still represents the current moment, which applies to the following descriptions.

The pay per unit power generation (PUPG) reaching a minimum value may be represented as:

$$\min_{it} PUPG_{it}$$

where the F represents the equivalent fatigue load, $F_{his}$ represents the historical equivalent fatigue load, and the fatigue deviation reaching a minimum value may be represented as:

$$\min_{it}((F_{it} + F_{his,i} + f_{indicator,it}) - \text{average}(F_{it} + F_{his,i} + f_{indicator,it}))$$

Optionally, in step S103, the selecting, based on the reference indexes, one of the set of preset power values as the optimal power value may specifically include: determining an index product and an index sum of the reference indexes corresponding to each of the preset power values, and determining a ratio of the index product to the index sum as a comprehensive index corresponding to the preset power value; and determining a preset power value with a minimum comprehensive index as the optimal power value. By determining the product and sum of the indexes, and determining the ratio of product to the sum of the indexes the reference indexes may be transformed into the comprehensive index. When the comprehensive index reaches a minimum value, the reference indexes may be reduced as much as possible, so that the economic benefits of the wind farm can be fully improved, and a clear judgment criteria can be provided, making it easy to achieve.

Specifically, corresponding to the above symbolic representation, the condition condition where the comprehensive index reaches the minimum value may be represented as:

$$\text{condition} = \min_{it} \frac{PUPG_{it} \times f_{indicator,it} \times ((F_{it} + F_{his,i} + f_{indicator,it}) - \text{average}(F_{it} + F_{his,i} + f_{indicator,it}))}{PUPG_{it} \times f_{indicator,it} \times ((F_{it} + F_{his,i} + f_{indicator,it}) - \text{average}(F_{it} + F_{his,i} + f_{indicator,it}))}$$

Optionally, the reference indexes may further include a sum of the consumed fatigue loads of the plurality of wind turbines. The smaller the sum is, the smaller the overall consumed fatigue loads of the whole wind farm is, thereby reducing fatigue abrasion of the whole wind farm. By providing this reference index, the economic benefits of the wind farm can be further improved. It should be understood that, for the embodiment in which the comprehensive index is determined, the sum is also added to the comprehensive index.

Specifically, the sum of consumed fatigue loads of the plurality of wind turbines reaching a minimum value may be represented as:

$$\min_{t} \sum_{i=1}^{n}(F_{it} + F_{his,i} + f_{indicator,it})$$

Referring to FIG. 3, in step S103, the operation of determining the power regulating sequence of the plurality of wind turbines according to the entire fatigue load may be performed by a controlling and monitoring unit, and the operation of determining the optimal power value may be performed by the arithmetic logic unit.

Still referring to FIG. 1, in step S104, a control instruction is sent to the at least one of the wind turbines to adjust a power value of the at least one of the wind turbines to the optimal power value for the wind turbine. The control instruction containing the optimal power value is sent to a wind turbine with a power value which requires an adjustment, so that power adjustment of the wind farm is finally completed, and the power limiting instruction is satisfied. Specifically, with reference to FIG. 2, the farm controller may send the control instruction to the wind turbines. Under a condition that the number of wind turbines with power values requiring an adjustment is greater than 1, control instructions containing corresponding optimal power values may be sent to these wind turbines respectively to reduce data transmission; or a control instruction containing all optimal power values may be sent to all these wind turbines, and a mark of a corresponding wind turbine is added for each of the optimal power values, so that the wind turbines read their own optimal power values, so as to reduce a control error caused by sending the control instruction mistakenly; or a control instruction containing power values that should be output by the respective wind turbines in the wind farm is sent to the all of these wind turbines in the wind farm, so as to achieve an instruction transmission with no discrimination, and further reduce an effect caused by sending instructions mistakenly. For the operation of adjusting the power value, a torque and rotation speed power table is stored in each of the wind turbines, and after receiving the optimal power value, the wind turbine may search the torque and rotation speed power table according to the optimal power value and a current wind speed to obtain a corresponding torque and a corresponding rotation speed, and then adjust its operation according to the corresponding torque and the rotation speed, so as to reach the optimal power value and complete power adjustment.

Referring to FIG. 3, the step S104 is performed by the controlling and monitoring unit.

According to the embodiments of the present disclosure, after one power adjustment is completed, the method for controlling power may further include: determining, during the limited power cycle, a sum of the historical equivalent fatigue load and the equivalent fatigue load as an updated historical equivalent fatigue load; and repeating the step of acquiring the entire fatigue load, the equivalent fatigue load of the target component and the pay per unit power generation of each of the plurality of wind turbines at a current moment to update the optimal power value. As described above, the step S102 may be performed at the starting moment to of the limited power cycle, and the power adjustment is completed in the step S104. However, after the starting moment to, the limited power cycle further includes moments $t_1, t_2, \ldots,$ and $t_n$. The equivalent fatigue load of the previous moment is put into the historical $t_2$, equivalent fatigue load so as to update the historical equivalent fatigue load, and steps S102 to S104 are performed cyclically in subsequent moments, so that the power values of the wind turbines in the wind farm can be adjusted on a real-time basis within the limited power cycle, thereby ensuring that the pay of the wind farm is always small, and fully improving the economic benefits of the wind farm. It should be understood that, as the starting moment to is described in step S102, the accuracy of subsequent moments may also be selected appropriately. The real-time adjustment described here refers to that the steps S102 to S104 are performed cyclically throughout the limited power cycle, so as to achieve dynamic adjustment of the power values of the wind turbines, and the degree of "real-time" depends on accuracy of a value of each moment, that is, depends on an update frequency of data. In addition, when a new equivalent fatigue load is determined, in order to ensure continuity of data, operation data during a period from the moment the equivalent fatigue load was last calculated to the current moment may be obtained, and used to calculate the equivalent fatigue load accordingly. Taking the moment $t_1$ as an example, the equivalent fatigue loads corresponding to the period from the moment $t_0$ to the moment $t_1$ are calculated, and a duration of the period also depends on the update frequency of data.

Referring to FIG. 3, operations of updating the data and re-triggering step S102 are performed by a data updating unit, the data storage unit may be triggered to re-acquire the equivalent fatigue load, and the arithmetic logic unit may be triggered to re-acquire the entire fatigue load and the pay per unit power generation.

In general, the system for controlling power includes the data storage unit for acquiring and storing the equivalent fatigue loads for various periods, the arithmetic logic unit for calculating the optimal power value, the controlling and monitoring unit for determining the adjustment priority of the wind turbines and sending the control instruction, and the data updating unit for updating the historical equivalent fatigue load. Herein the data storage unit is electrically connected to the arithmetic logic unit and the data updating unit, may transmit the historical equivalent fatigue load to the arithmetic logic unit, and may transmit the historical equivalent fatigue load and the equivalent fatigue load to the data updating unit for updating the historical equivalent fatigue load, and the data storage unit is triggered by the data updating unit to acquire the new equivalent fatigue load; the arithmetic logic unit is electrically connected to the control monitoring unit, and transmits the determined optimal power value of the at least one wind turbine to the controlling and monitoring unit so as to achieve control; and the controlling and monitoring unit is electrically connected to the data updating unit to start the next power adjustment after current power adjustment is completed.

In the method for controlling power according to of the embodiments of the present disclosure, from the perspective of the whole wind farm, the received power limiting instruction may be combined with the entire fatigue load to determine the adjustment priority of the wind turbines rapidly, so that a response speed of the wind farm is accelerated, and the entire fatigue loads of the wind turbines are ensured to be consumed as uniformly as possible; from the perspective of the single wind turbine, the specific optimal power value is determined according to the historical equivalent fatigue load, the entire fatigue load, the equivalent fatigue load and the pay per unit power generation, so that the losses of the wind turbines in the wind farm may be balanced, so as to ensure the uniform maintenance cycle and reduce operation and maintenance costs in the wind farm and the loss of the single wind turbine, thereby improving the overall economic benefits of the wind farm. A hierarchical multi-objective optimization strategy is applied, so that a load consumption value of the wind turbine is ensured to be partially minimum when the adjustment is performed while satisfying the instruction from the power grid rapidly, thereby improving the economic benefits of the wind farm during its whole life cycle.

From the perspective of the single wind turbine, a value is selected from the set of preset power values as the optimal power value, and the minimization of the comprehensive index converted from the plurality of reference indexes is regarded as an objective of selecting the optimal power value, so that the solving difficulty may be reduced significantly, and the calculation efficiency may be improved, thereby satisfying the power limiting instruction of the power grid rapidly.

In addition, the historical equivalent fatigue load is updated continuously, and a new optimal power value is determined accordingly, so that an overall real-time adjustment within the limited power cycle may be achieved, and the pay of the wind farm may be further reduced, thereby improving the economic benefits of the wind farm.

Figure 4:
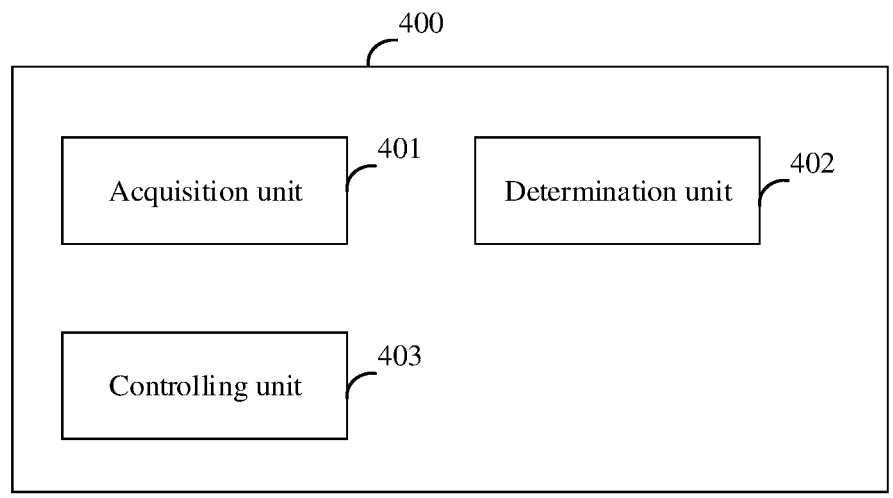
FIG. 4 is a block diagram showing an apparatus for controlling power of a wind farm according to embodiments of the present disclosure.

FIG. 4 is a block diagram showing an apparatus for controlling power of a wind farm according to embodiments of the present disclosure.

Referring to FIG. 4, an apparatus 400 for controlling power of a wind farm includes an acquisition unit 401, a determination unit 402, and a controlling unit 403.

The acquisition unit 401 may be configured to acquire a historical equivalent fatigue load of a target component of each of a plurality of wind turbines in the wind farm during a target historical period.

According to the embodiments of the present disclosure, the target component is a component of the wind turbine, such as a turbine head, a blade, a tower top, a tower bottom, and the like, from which at least one of these components may be selected according to a degree of attention paid by the wind farm on the respective components. It should be understood that though a plurality of solutions may be provided for selecting the target component, it requires to keep the selected target component to be the same for a same round of power control.

The target historical period may be an entire period for a wind turbine from a moment where the wind turbine is put into use to a current moment, so as to obtain the fatigue load consumption of the target component of the wind turbine more accurately.

For operation of the wind farm under a limited power, referring to FIG. 2, the power grid often sends a power limiting instruction to the farm controller in the wind farm in advance, wherein the power limiting instruction includes a limited power cycle and a limited power value, that is, an overall output power value of a wind farm which who receives the instruction is required to not exceed the limited power value in a certain future period. Since the target historical period is generally relatively long and there may involve a large amount of data, so upon reception of the power limiting instruction, it prepares to acquire data to obtain the historical equivalent fatigue load. It should be understood that, during a period from the moment at which the power limiting instruction is received to a moment at which the limited power cycle starts, if the wind turbine continues to operate, equivalent fatigue load for the period also should be calculated and included in the historical equivalent fatigue load.

According to the embodiments of the present disclosure, the historical equivalent fatigue load may be obtained by inputting operation data of each of the plurality of wind turbines during the target historical period into a preset model trained by machine learning. Since the operation data is data collected during daily operation of the wind farm, no additional device is required, so optimization cost of the power control may be reduced. In addition, the operation data is data actually detected for the wind turbines, there is high reliability, thereby ensuring accuracy of the obtained historical equivalent load.

Specifically, the target historical period may be divided into a plurality of sub-periods, operation data for the respective sub-periods may be input into the preset model to obtain equivalent fatigue loads corresponding to the respective sub-periods, and a sum of these equivalent fatigue loads may be calculated as the historical equivalent fatigue load. Specifically, the operation data for the wind turbine may be supervisory control and data acquisition (SCADA, that is, a supervisory control and data acquisition system) data, wherein the system may monitor condition of the wind turbines, and start and stop the wind turbines in the whole wind farm, by including large-scale monitoring software and an improved communication network. The operation data input into the preset model may include a power value, a power generation capacity, a rotor speed, a generator torque, a component of nacelle acceleration along a direction x, and a component of the nacelle acceleration along a direction y, a pitch angle, and the like. Of course, the data are merely examples, and may selected specifically depending on a selected target component. A suitable model and a suitable training method for machine learning may be selected for the preset model and its specific training method, which is not limited by the present disclosure.

Referring to FIG. 3, the operation of acquiring the historical equivalent fatigue loads by the acquisition unit 401 is performed by a data storage unit, and the data storage unit may specifically store the equivalent fatigue loads output by the preset model in corresponding periods.

The acquisition unit 401 may be further configured to acquire, in response to entering a limited power cycle, an entire fatigue load, an equivalent fatigue load of the target component and a pay per unit power generation of each of the plurality of wind turbines at a current moment, wherein the pay per unit power generation of a wind turbine is obtained based on the equivalent fatigue load and power generation of the wind turbine. These data may reflect operation condition of the wind turbine, and may be used subsequently in the determination unit 402 to determine a suitable optimal power value for the wind turbine, thereby improving economic benefits of the wind farm. It should be understood that, the current moment here is theoretically a starting moment to of the limited power cycle, but depending on accuracy of a system, there may be a margin of errors in an actual operation, which still fall within the protection scope of the present disclosure.

According to the embodiment of the present disclosure, the entire fatigue load may be obtained based on a wind resource parameter at the current moment, which takes an effect of the wind resource on an entire wind turbine into consideration, thereby reflecting operation condition of the wind turbine as a whole.

Optionally, the wind resource parameter may include statistical values of turbulence intensity under a plurality of wind speeds, probability densities of the plurality of respective wind speeds, and probability densities of a plurality of wind directions corresponding to the plurality of respective wind speeds, and wherein the entire fatigue load is obtained by accumulating the statistical values of turbulence intensity on a dimension of wind speed and a dimension of wind direction. The turbulence intensity is equal to a ratio of a standard deviation of the wind speeds to an average of the wind speeds, and describes how the wind speed changes as time and space changes, thereby reflecting relative intensity of a fluctuating wind speed. Therefore, the turbulence intensity embodies the effect of wind, and is a main parameter for measuring the entire fatigue load. Furthermore, the wind acting on different wind turbines may have different wind speeds, each wind speed has its probability density, and the wind blows from a certain direction, so a wind direction also has its probability density, and different wind directions have different effects on different wind turbines. By accumulation of the statistical values of the turbulence intensity on the dimension of wind speed and the dimension of wind direction may reflect effects of the wind speed and the wind direction, so that the obtained entire fatigue load can reflects an effect of wind on the wind turbine more accurately.

Specifically, the statistical value of the turbulence intensity may be a standard deviation of turbulence intensity y, and the standard deviation of the turbulence intensity under a wind speed $Wsp_j$ may be represented as $\sigma_1(Wsp_j)$, in which the entire fatigue load $f_{indicator,t}$ at a current moment t may be obtained by: determining, for each of the wind turbines and for each of the wind speeds, a product of an m-th power of a standard deviation $\sigma_1(Wsp_j)$ of turbulence intensity under a wind speed, a probability density $pdf(Wsp_j)$ of the wind speed, and a probability density $pdf(Dir_j)$ of a corresponding wind direction, and determining a sum of the products as a reference load, wherein m is a material Wolter coefficient of the wind turbine; and determining a (1/m)-th power of the reference load as the entire fatigue load of the wind turbine. That is:

$$f_{indicator,t} = \left( \sum_{j=1}^{N} (\sigma_1(Wsp_j))^m \times pdf(Wsp_j) \times pdf(Dir_j) \right)^{\frac{1}{m}}$$

According to the embodiments of the present disclosure, the calculation of the equivalent fatigue load of the target component may be referred to the way of calculating the historical equivalent fatigue load: inputting the operation data of the wind turbine for the current moment into the preset model to obtain the equivalent fatigue load of the target component for the current moment.

According to the embodiments of the present disclosure, the pay per unit power generation at the current moment is a ratio of the equivalent fatigue load of the target component at the current moment to the power generation of the wind turbine at the current moment, and represents an equivalent fatigue load consumed for generating a unit amount of power. The generated amount of power is used as the operation data, and may be obtained directly.

Referring to FIG. 3, the operation of acquiring the whole machine fatigue load by the acquisition unit 401 is performed by the data storage unit, and the operation of acquiring the whole machine fatigue load and the pay per unit power generation is performed by the arithmetic logic unit.

The determination unit 402 may be configured to determine an optimal power value of at least one of the wind turbines according to the historical equivalent fatigue load as well as the entire fatigue load, the equivalent fatigue load and the pay per unit power generation, to ensure that a sum of power values of the plurality of wind turbines is less than or equal to a limited power value corresponding to the limited power cycle. The historical equivalent fatigue load, the entire fatigue load, the equivalent fatigue load, and the pay per unit power generation may reflect the operation condition of the wind turbine. By combining these parameters, at least one of the wind turbines is selected, and its optimal power value, that is, a target power value a user wants is specifically determined. The target power value enables losses of the wind turbines in the wind farm to be balanced as much as possible while satisfying the power limiting instruction, so as to ensure a uniform maintenance cycle and reduce operation and maintenance costs for the wind farm and losses of the wind turbines, thereby improving overall economic benefits of the wind farm. It should be understood that, each wind turbine in the wind farm has its current actual power value, so for the selected wind turbine, its power value may be replaced by the optimal power value. The purpose of the adjustment in the determination unit 402 is that a sum of power values of all the wind turbines after the replacement is less than or equal to the limited power value.

Specifically, according to the embodiments of the present disclosure, the determination unit 402 may be configured to perform the following operation: determining, for the plurality of wind turbines, the optimal power value according to the historical equivalent fatigue load as well as the entire fatigue load, the equivalent fatigue load and the pay per unit power generation on a basis of a wind turbine and in an order of the entire fatigue load from largest to smallest, until the sum of the power values of the plurality of wind turbines is less than or equal to the limited power value (before adjustment of the power values, a sum of power values of all of the wind turbines in the wind farm is usually greater than the limited power value; if the sum is less than or equal to the limited power value, the adjustment is not required, and initial power values are maintained)

In other words, under a condition that the adjustment is made, an optimal power value (correspondingly, marked as $p_{opti,k}$) of one wind turbine (for example, marked as Turbine$_k$) with a maximum whole machine fatigue load is determined firstly, and then it is determined whether the sum of the power values of the plurality of wind turbines is less than or equal to the limited power value. Under a condition that the sum of the power values of the plurality of wind turbines is still greater than the limited power value, one wind turbine with a maximum whole machine fatigue load is continuously selected from wind turbines having power values which have not been adjusted yet, so as to determine an optimal power value of the wind turbine with the maximum whole machine fatigue load. Under a condition that the sum of the power values is less than or equal to the limited power value, the power limiting instruction is satisfied, and remaining wind turbines having power values which are not adjusted may maintain their initial power values.

The entire fatigue load reflects operation condition of the entire wind turbine. By determining an adjustment priority for the wind turbine based on the entire fatigue load (that is, the greater the parameter is, the higher the priority is), a wind turbine carrying a relatively great fatigue load from the perspective of the whole wind farm can be preferentially selected, and its power value and in turn its entire fatigue load can be reduced, such that the entire fatigue loads of the respective wind turbines are consumed as uniformly as possible. On the other hand, based only on this parameter, an operation state of each of the wind turbines in the wind farm can be evaluated rapidly, and then a priority of applying a power limiting strategy for the wind turbines may be determined based on results of the evaluation, thereby expediting satisfaction of the power limiting instruction.

It should be understood that, the priority here includes a priority of a wind turbine in the wind farm and a priority of an operating mode of the wind turbine. That is, from the perspective of the wind farm, the greater the entire fatigue load of the wind turbine is, the higher the priority for the wind turbine operates in a limited power is; and from the perspective of a the wind turbine, the greater the entire fatigue load is, the higher the priority of a power limiting mode is, and the lower the priority of a normal power generation mode is.

Optionally, for a selected target wind turbine (as the selection as discussed above, it is the wind turbine with the maximum entire fatigue load among the wind turbines whose power values have not been adjusted), its optimal power value is selected from a plurality of alternative preset power values. Compared with calculating an optimal power value directly according to the parameters, this may greatly reduce difficulty in solving the value, and is helpful for improving calculation efficiency, thereby expediting satisfaction of the power limiting instruction from the power grid. Accordingly, before the operation is performed by the determination unit 402, the acquisition unit 401 may further be configured to acquire a set of preset power values for a target wind turbine among the plurality of wind turbines, and traverse the set of preset power values, re-determine an equivalent fatigue load and power generation of the target wind turbine at the current moment according to the respective preset power values, and re-determine the pay per unit power generation according to the equivalent fatigue load and the power generation. Since the power value is a piece of operation data, and will affects power generation, so when the power value changes, the equivalent fatigue load and the power generation will change accordingly. By re-determining the equivalent fatigue load and the power generation according to the preset power value, it is possible to understand that a change that occurs when a corresponding preset power value is determined as the optimal power value, and take it as a basis for the determination unit 402 to select an appropriate preset power value.

It should be understood that, a set of preset power values for a current target wind turbine may be obtained on a basis of wind turbine, or sets of preset power values for several wind turbines with relatively greater entire fatigue loads may be obtained at one time, or sets of preset power values s for all of the wind turbines may be obtained at one time for use later, which are implementations of the present disclosure and fall within the protection scope of the present disclosure.

The set of preset power values may, for example, include a plurality of preset power values which are obtained from a full power value of the target wind turbine subtracted gradually by a preset value, wherein a minimum one of the set of preset power values is greater than or equal to 0. Taking that the preset difference is equal to 50 KW, the full power value is p, and the minimum preset power value in the set of preset power values is equal to 0 as an example, the set of preset power values may be represented as $p_{set,i}=\{p, p-50, p-100, \ldots, 100, 50, 0\}$, in which the i represents a serial number of the wind turbines. By the embodiment, the preset power values may be selected uniformly, and the difference value may be selected appropriately according to different accuracy requirements in an actual operation. It should be understood that, if the minimum preset power value in the set of preset power values is equal to 0, it represents that the target wind turbine should stop operating, and if the minimum preset power value in the set of preset power values is greater 0, it represents that the target wind turbine should not stop operating, so a minimum power value (such as p−1000) may be defined for the wind turbine, thereby achieving flexible control.

Accordingly, the determination unit 402 may be configured to: determine reference indexes corresponding to the respective preset power values at the current moment, wherein the reference indexes comprises the entire fatigue load, the pay per unit power generation, and a difference between a consumed fatigue load and an average value of consumed fatigue loads of the plurality of wind turbines (referred to as fatigue difference hereinafter), and wherein the consumed fatigue load is a sum of the historical equivalent fatigue load, the equivalent fatigue load and the entire fatigue load; and select, based on the reference indexes, one of the set of preset power values as the optimal power value, such that the reference indexes corresponding to the optimal power value are all less than the respective reference indexes corresponding to at least a part of other preset power values among the set of preset power values.

By selecting the three reference indexes, and taking a preset power value with reference indexes which are less than reference indexes corresponding to at least a part of other preset power values as the optimal power value, the reference indexes of the optimal power values are relatively smaller, so as to reduce consumption of the wind turbine and improve overall economic benefits of the wind farm.

Specifically, the smaller the entire fatigue load is, the smaller the damage to the wind turbine is; the smaller the pay per unit power generation is. The smaller the equivalent fatigue load consumed for generating unit amount of power is, costs of the wind turbine for power generation can be reduced, and economic benefits of the wind turbine can be improved; the smaller the fatigue deviation is, the more uniform the consumed fatigue load of the wind turbines in the wind farm tends to be, and the closer the degree of fatigue abrasion of the wind turbines is, so as to ensure a uniform maintenance cycle and reduce operation and maintenance costs for the wind farm and losses of the wind turbines. If the above discussed reference indexes can reach minimum values at the same time, the economic benefits of the wind farm can be improved significantly, but under this condition the calculation is relatively difficult, and an exact solution even cannot be obtained. By defining the reference indexes to be less than reference indexes corresponding to at least a part of other preset power values (rather than all other preset power values), t each of reference indexes may be relatively smaller, thereby not only economic benefits of the wind farm can be fully improved, but also solving difficulty can be reduced and response efficiency can be improved, which facilities reduction of costs and satisfaction of the power limiting instruction from the power grid rapidly.

Specifically, the whole machine fatigue load $f_{indicator}$ reaches a minimum value which may be represented as:

$$\min_{it} f_{indicator,it}$$

where the i still represents the serial number of the wind turbines, and the t still represents the current moment, which applies to the following descriptions.

The pay per unit power generation (PUPG) reaches a minimum value which may be represented as:

$$\min_{it} PUPG_{it}$$

where the F represents the equivalent fatigue load, $F_{his}$ represents the historical equivalent fatigue load, and the fatigue deviation reaching a minimum value may be represented as:

$$\min_{it}((F_{it} + F_{his,i} + f_{indicator,it}) - \text{average}(F_{it} + F_{his,i} + f_{indicator,it}))$$

Optionally, the operation performed by the determination unit 402 of selecting, based on the reference indexes, one of the set of preset power values as the optimal power value may specifically include: determining an index product and an index sum of the reference indexes corresponding to each of the preset power values, and determining a ratio of the index product to the index sum as a comprehensive index corresponding to the preset power value; and determining a preset power value with a minimum comprehensive index as the optimal power value. By determining the product and sum of the indexes, and determining the ratio of product to the sum of the indexes the reference indexes may be transformed into the comprehensive index. When the comprehensive index reaches a minimum value, the reference indexes may be reduced as much as possible, so that the economic benefits of the wind farm can be fully improved, and a clear judgment criteria can be provided, making it easy to achieve.

Specifically, corresponding to the above symbolic representation, the condition condition where the comprehensive index reaches the minimum value may be represented as:

$$\text{condition} = \min_{it} \frac{PUPG_{it} \times f_{indicator,it} \times \frac{((F_{it} + F_{his,i} + f_{indicator,it}) - \text{average}(F_{it} + F_{his,i} + f_{indicator,it}))}{PUPG_{it} \times f_{indicator,it} \times \frac{((F_{it} + F_{his,i} + f_{indicator,it}) - \text{average}(F_{it} + F_{his,i} + f_{indicator,it}))}{}}}$$

Optionally, the reference indexes may further include a sum of the consumed fatigue loads of the plurality of wind turbines. The smaller the sum is, the smaller the overall consumed fatigue loads of the whole wind farm is, thereby reducing fatigue abrasion of the whole wind farm. By providing this reference index, the economic benefits of the wind farm can be further improved. It should be understood that, for the embodiment in which the comprehensive index is determined, the sum is also added to the comprehensive index.

Specifically, the sum of consumed fatigue loads of the plurality of wind turbines reaching a minimum value may be represented as:

$$\min_{t} \sum_{i=1}^{n} (F_{it} + F_{his,i} + f_{indicator,it})$$

Referring to FIG. 3, the operation of determining the power regulating sequence of the plurality of wind turbines by the determination unit 402 according to the whole machine fatigue load is performed by the controlling and monitoring unit, and the operation of determining the optimal power value may be performed by the arithmetic logic unit.

The controlling unit 403 may be configured to send a control instruction to the at least one of the wind turbines to adjust a power value of the at least one of the wind turbines to the optimal power value for the wind turbine. The control instruction containing the optimal power value is sent to a wind turbine with a power value which requires an adjustment, so that power adjustment of the wind farm is be finally completed, and the power limiting instruction is satisfied. Specifically, with reference to FIG. 2, the farm controller may send the control instruction to the wind turbines. Under a condition that the number of wind turbines with power values requiring an adjustment is greater than 1, control instructions containing corresponding optimal power values may be sent to these wind turbines respectively to reduce data transmission; or a control instruction containing all optimal power values may be sent to all these wind turbines, and a mark of a corresponding wind turbine is added for each of the optimal power values, so that the wind turbines read their own optimal power values, so as to reduce a control error caused by sending the control instruction mistakenly; or a control instruction containing power values that should be output by the respective wind turbines in the wind farm is sent to the all of these wind turbines in the wind farm, so as to achieve an instruction transmission with no discrimination, and further reduce an effect caused by sending instructions mistakenly. For the operation of adjusting the power value, a torque and rotation speed power table is stored in each of the wind turbines, and after receiving the optimal power value, the wind turbine may search the torque and rotation speed power table according to the optimal power value and a current wind speed to obtain a corresponding torque and a corresponding rotation speed, and then adjust its operation according to the corresponding torque and the rotation speed, so as to reach the optimal power value and complete power adjustment.

Referring to FIG. 3, the controlling unit 403 corresponds to the controlling and monitoring unit.

According to the embodiments of the present disclosure, after one power adjustment is completed, the acquisition unit 401 may further be configured to: determine, during the limited power cycle, a sum of the historical equivalent fatigue load and the equivalent fatigue load as an updated historical equivalent fatigue load; and repeat the step of acquiring the entire fatigue load, the equivalent fatigue load of the target component and the pay per unit power generation of each of the plurality of wind turbines at a current moment to update the optimal power value. As described above, the acquisition unit 401 may operate at the starting moment to of the limited power cycle, and the power adjustment is completed by the controlling unit 403. However, after the starting moment to, the acquisition unit 401, the determination unit 402, and the controlling unit 403 continue to operate at subsequent moments. The equivalent fatigue load of the previous moment is put into the historical equivalent fatigue load so as to update the historical equivalent fatigue load, and steps S102 to S104 are performed cyclically in subsequent moments, so that the power values of the wind turbines in the wind farm can be adjusted on a real-time basis within the limited power cycle, thereby ensuring that the pay of the wind farm is always small, and fully improving the economic benefits of the wind farm. It should be understood that, as the starting moment to is described above, the accuracy of subsequent moments may also be selected appropriately. The real-time adjustment described here refers to that the acquisition unit 401, the determination unit 402, and the controlling unit 403 operate cyclically throughout the limited power cycle, so as to achieve dynamic adjustment of the power values of the wind turbines, and the degree of "real-time" depends on accuracy of a value of each moment, that is, depends on an update frequency of data. In addition, when a new equivalent fatigue load is determined, in order to ensure continuity of data, operation data during a period from the moment the equivalent fatigue load was last calculated to the current moment may be obtained, and used to calculate the equivalent fatigue load accordingly. Taking the moment $t_1$ as an example, the equivalent fatigue loads corresponding to the period from the moment $t_0$ to the moment $t_1$ are calculated, and a duration of the period also depends on the update frequency of data.

Referring to FIG. 3, the operation of updating the historical equivalent fatigue load by the acquisition unit 401 may be performed by a data updating unit, the operation of re-acquiring the equivalent fatigue load by the acquisition unit 401 may be performed by the data storage unit, and the operations of re-acquiring the whole machine fatigue load and the pay per unit power generation by the acquisition unit 401 may be performed by the arithmetic logic unit.

In general, the system for controlling power includes the data storage unit for acquiring and storing the equivalent fatigue loads for various periods, the arithmetic logic unit for calculating the optimal power value, the controlling and monitoring unit for determining the adjustment priority of the wind turbines and sending the control instruction, and the data updating unit for updating the historical equivalent fatigue load. Herein the data storage unit is electrically connected to the arithmetic logic unit and the data updating unit, may transmit the historical equivalent fatigue load to the arithmetic logic unit, and may transmit the historical equivalent fatigue load and the equivalent fatigue load to the data updating unit for updating the historical equivalent fatigue load, and the data storage unit is triggered by the data updating unit to acquire the new equivalent fatigue load; the arithmetic logic unit is electrically connected to the controlling and monitoring unit, and transmits the determined optimal power value of the at least one wind turbine to the controlling and monitoring unit so as to achieve control; and the controlling and monitoring unit is electrically connected to the data updating unit to start the next power adjustment after current power adjustment is completed.

In the apparatus for controlling power according to of the embodiments of the present disclosure, from the perspective of the whole wind farm, the received power limiting instruction may be combined with the entire fatigue load to determine the adjustment priority of the wind turbines rapidly, so that a response speed of the wind farm is accelerated, and the entire fatigue loads of the wind turbines are ensured to be consumed as uniformly as possible; from the perspective of the single wind turbine, the specific optimal power value is determined according to the historical equivalent fatigue load, the entire fatigue load, the equivalent fatigue load and the pay per unit power generation, so that the losses of the wind turbines in the wind farm may be balanced, so as to ensure the uniform maintenance cycle and reduce operation and maintenance costs in the wind farm and the loss of the single wind turbine, thereby improving the overall economic benefits of the wind farm. A hierarchical multi-objective optimization strategy is applied, so that a load consumption value of the wind turbine is ensured to be partially minimum when the adjustment is performed while satisfying the instruction from the power grid rapidly, thereby improving the economic benefits of the wind farm during its whole life cycle.

From the perspective of the single wind turbine, a value is selected from the set of preset power values as the optimal power value, and the minimization of the comprehensive index converted from the plurality of reference indexes is regarded as an objective of selecting the optimal power value, so that the solving difficulty may be reduced significantly, and the calculation efficiency may be improved, thereby satisfying the power limiting instruction of the power grid rapidly.

In addition, the historical equivalent fatigue load is updated continuously, and a new optimal power value is determined accordingly, so that an overall real-time adjustment within the limited power cycle may be achieved, and the pay of the wind farm may be further reduced, thereby improving the economic benefits of the wind farm.

The method for controlling power in the wind farm according to the embodiments of the present disclosure may be written as a computer program and stored on a computer readable storage medium. When an instruction corresponding to the computer program is executed by a processor, the method for controlling power of the wind farm may be implemented. The computer program, when executed by a processor, may implement the cooling control method for the generator as described above. Examples of the computer readable storage media include: a read only memory (ROM), a random access programmable read only memory (PROM), an electrically erasable programmable read only memory (EEPROM), a random access memory (RAM), a dynamic random access memory (DRAM), a static random access memory (SRAM), a flash memory, a non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, a blue-ray or optical disk memory, a hard disk drive (HDD), a solid state hard disk (SSD), a card memory (such as a multi-media card, a secure digital (SD) card or a high speed digital (XD) card), a magnetic tape, a floppy disk, a magneto-optical data storage, an optical data storage, a hard disk, a solid state disk and any other apparatus, and the any other apparatus is configured to store a computer program and any associated data, data file and data structure in a non-transitory manner and provide the computer program and the any associated data, data file and data structure to a processor or a computer, so that the processor or the computer can execute the computer program. In one example, the computer program and the any associated data, data file and data structure are distributed over networked computer systems, so that the computer program and the any associated data, data file and data structure are stored, accessed and executed in a distributed manner by one or more processors or computers.

Figure 5:
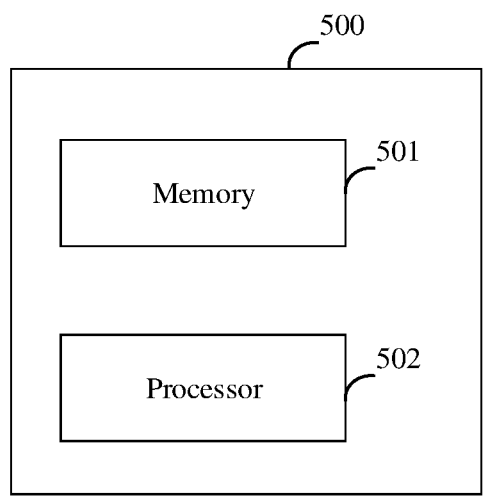
FIG. 5 is a block diagram show a computer device according to embodiments of the present disclosure.

FIG. 5 is a block diagram show a computer device according to embodiments of the present disclosure.

With reference to FIG. 5, a computer device 500 includes at least one memory 501 and at least one processor 502, the at least one memory 501 has stored a set of computer-executable instructions which, when executed by the at least one processor 502, performs a method for controlling power of a wind farm according to exemplary embodiments of the present disclosure.

As an example, the computer device 500 may be a PC computer, a tablet device, a personal digital assistant, a smart phone, or other apparatus capable of executing the set of computer-executable instructions. Herein, the computer device 500 may not be necessarily a single electronic device, but may be any collection of apparatuses or circuits capable of executing the instruction (or the set of instructions) alone or in combination. Further, the computer device 500 may be a part of an integrated control system or system manager, or may be configured as a portable electronic device that interfaces with local or remote device (for example, via wireless transmission).

In the computer device 500, the processor 502 may include a central processing unit (CPU), a graphics processor unit (GPU), a programmable logic apparatus, a specific processor system, a microcontroller, or a microprocessor. As an example but not limitation, the processor may include an analog processor, a digital processor, a microprocessor, a multi-core processor, a processor array, or a network processor, and the like.

The processor 502 may execute instructions or codes stored in the memory 501, and the memory 501 may also store data. The instructions and the data may be sent and received over a network via a network interface device, and the network interface apparatus may use any known transmission protocol.

The memory 501 may be integrated with the processor 502. For example, a RAM or a flash memory may be disposed within a microprocessor of an integrated circuit or the like. In addition, the memory 501 may include a stand-alone device, such as an external disk driver, a storage array, or any other storage device usable by a database system. The memory 501 and the processor 502 may be operatively coupled, or may communicate with each other through, for example, an I/O port, a network connection, and the like to enable the processor 502 to read files stored in the memory.

In addition, the computer device 500 may further include a video display (such as a liquid crystal display) and a user interaction interface (such as a keyboard, a mouse, a touch input device, and the like). All of the components of the computer device 500 may be connected to each other via a bus and/or network.

In the present disclosure, the entire fatigue load, the historical equivalent fatigue load of the target component, the equivalent fatigue load and the pay per unit power generation are used, which takes operation losses and pays of each of wind turbines in the wind farm into consideration, and accordingly, an optimal power value of at least one of the wind turbines is determined specifically. Compared with strategies such as that several wind turbines are simply selected and stopped or that a limited power value is allocated for each of wind turbines proportionally, the present application can balance losses of the wind turbines in the wind farm, so as to ensure a uniform maintenance cycle and reduce operation and maintenance costs for the wind farm and losses of the wind turbines, thereby improving overall economic benefits of the wind farm.

The specific implementations of the present disclosure have been described in detail above. Although some of the embodiments of the present disclosure have been illustrated and described, those skilled in the art should understand that changes and modifications may be made to these embodiments without departing from the scope of principle and gist of the present disclosure defined by the claims and their equivalents, and these changes and modifications should be within the protection scope of the claims of the present disclosure.

What is claimed is:

1. A method for controlling power of a wind farm, wherein the method for controlling power comprises:
    acquiring a historical equivalent fatigue load of a target component of each of a plurality of wind turbines in the wind farm during a target historical period;
    acquiring, in response to entering a limited power cycle, an entire fatigue load, an equivalent fatigue load of the target component and a pay per unit power generation of each of the plurality of wind turbines at a current moment, wherein the pay per unit power generation of a wind turbine is obtained based on the equivalent fatigue load and power generation of the wind turbine;
    determining an optimal power value of at least one of the wind turbines according to the historical equivalent fatigue load as well as the entire fatigue load, the equivalent fatigue load and the pay per unit power generation, to ensure that a sum of power values of the plurality of wind turbines is less than or equal to a limited power value in the limited power cycle; and
    sending a control instruction to the at least one of the wind turbines to adjust a power value of the at least one of the wind turbines to the optimal power value for the wind turbine.

2. The method for controlling power according to claim 1, wherein the determining the optimal power value of the at least one of the wind turbines according to the historical equivalent fatigue load as well as the entire fatigue load, the equivalent fatigue load and the pay per unit power generation, to ensure that a sum of power values of the plurality of wind turbines is less than or equal to a limited power value in the limited power cycle comprises:
    determining, for the plurality of wind turbines, the optimal power value according to the historical equivalent fatigue load as well as the entire fatigue load, the equivalent fatigue load and the pay per unit power generation on a basis of a wind turbine and in an order of the entire fatigue load from largest to smallest, until the sum of the power values of the plurality of wind turbines is less than or equal to the limited power value.

3. The method for controlling power according to claim 1, wherein before the determining the optimal power value according to the historical equivalent fatigue load as well as the entire fatigue load, the equivalent fatigue load and the pay per unit power generation, the method further comprises:
    acquiring a set of preset power values for a target wind turbine among the plurality of wind turbines; and
    traversing the set of preset power values, re-determining an equivalent fatigue load and power generation of the target wind turbine at the current moment according to the respective preset power values, and re-determining the pay per unit power generation according to the equivalent fatigue load and the power generation.

4. The method for controlling power according to claim 3, wherein the determining the optimal power value according to the historical equivalent fatigue load as well as the entire fatigue load, the equivalent fatigue load and the pay per unit power generation comprises:
    determining reference indexes corresponding to the respective preset power values at the current moment, wherein the reference indexes comprises the entire fatigue load, the pay per unit power generation, and a difference between a consumed fatigue load and an average value of consumed fatigue loads of the plurality of wind turbines, and wherein the consumed fatigue load is a sum of the historical equivalent fatigue load, the equivalent fatigue load and the entire fatigue load; and
    selecting, based on the reference indexes, one of the set of preset power values as the optimal power value, such that the reference indexes corresponding to the optimal power value are all less than the respective reference indexes corresponding to at least a part of other preset power values among the set of preset power values.

5. The method for controlling power according to claim 4, wherein the selecting, based on the reference indexes, one of the set of preset power values as the optimal power value comprises:
    determining an index product and an index sum of the reference indexes corresponding to each of the preset power values, and determining a ratio of the index product to the index sum as a comprehensive index corresponding to the preset power value; and
    determining a preset power value with a minimum comprehensive index as the optimal power value, and
    wherein the reference indexes each further comprises a sum of the consumed fatigue loads of the plurality of wind turbines.

6. The method for controlling power according to claim 3, wherein
    the set of preset power values comprises a plurality of preset power values which are obtained from a full power value of the target wind turbine subtracted gradually by a preset value, wherein a minimum one of the set of preset power values is greater than or equal to 0.

7. The method for controlling power according to claim 1, wherein the historical equivalent fatigue load and the equivalent fatigue load are obtained by inputting operation data of each of the plurality of wind turbines during a corresponding period into a preset model trained by machine learning.

8. The method for controlling power according to claim 1, wherein the entire fatigue load is obtained based on a wind resource parameter at the current moment, and
the wind resource parameter comprises statistical values of turbulence intensity under a plurality of respective wind speeds, probability densities of the plurality of respective wind speeds, and probability densities of a plurality of wind directions corresponding to the plurality of respective wind speeds, and wherein the entire fatigue load is obtained by accumulating the statistical values of turbulence intensity with consideration of the probability densities of the plurality of respective wind speeds and the probability densities of a plurality of wind directions corresponding to the plurality of respective wind speeds.

9. The method for controlling power according to claim 8, wherein the statistical value of each turbulence intensity is a standard deviation of turbulence intensity, and wherein the entire fatigue load is obtained by: determining, for each of the wind turbines and for each of the wind speeds, a product of an m-th power of a standard deviation of turbulence intensity, a probability density of the wind speed, and a probability density of a corresponding wind direction, and determining a sum of the products as a reference load, wherein m is a material Wolter coefficient of the wind turbine;
determining a (1/m)-th power of the reference load as the entire fatigue load of the wind turbine.

10. The method for controlling power according to claim 1, wherein the method for controlling power further comprises:
determining, during the limited power cycle, a sum of the historical equivalent fatigue load and the equivalent fatigue load as an updated historical equivalent fatigue load;
repeating the step of acquiring the entire fatigue load, the equivalent fatigue load of the target component and the pay per unit power generation of each of the plurality of wind turbines at a current moment to update the optimal power value.

11. A non-transitory computer readable storage medium having instructions which, when executed by at least one processor, cause the at least one processor to perform the method for controlling power according to claim 1.

12. An apparatus for controlling power of a wind farm, wherein the apparatus for controlling power comprises:
at least one processor;
at least one memory storing computer-executable instructions,
wherein the computer-executable instructions, when executed by the at least one processor, cause the at least one processor to:
acquire a historical equivalent fatigue load of a target component of each of a plurality of wind turbines in the wind farm during a target historical period;
acquire, in response to entering a limited power cycle, an entire fatigue load, an equivalent fatigue load of the target component and a pay per unit power generation of each of the plurality of wind turbines at a current moment, wherein the pay per unit power generation of a wind turbine is obtained based on the equivalent fatigue load and power generation of the wind turbine;
determine an optimal power value of at least one of the wind turbines according to the historical equivalent fatigue load as well as the entire fatigue load, the equivalent fatigue load and the pay per unit power generation, to ensure that a sum of power values of the plurality of wind turbines is less than or equal to a limited power value in the limited power cycle; and
send a control instruction to the at least one of the wind turbines to adjust a power value of the at least one of the wind turbines to the optimal power value for the wind turbine.

13. The apparatus for controlling power according to claim 12, wherein the processor is further configured to:
determine, for the plurality of wind turbines, the optimal power value according to the historical equivalent fatigue load as well as the entire fatigue load, the equivalent fatigue load and the pay per unit power generation on a basis of a wind turbine and in an order of the entire fatigue load from largest to smallest, until the sum of the power values of the plurality of wind turbines is less than or equal to the limited power value.

14. The apparatus for controlling power claim 12, wherein the processor is further configured to:
acquire a set of preset power values for a target wind turbine among the plurality of wind turbines; and
traverse the set of preset power values, re-determine an equivalent fatigue load and power generation of the target wind turbine at the current moment according to the respective preset power values, and re-determine the pay per unit power generation according to the equivalent fatigue load and the power generation.

15. The apparatus for controlling power according to claim 14, wherein the processor is further configured to:
determine reference indexes corresponding to the respective preset power values at the current moment, wherein the reference indexes comprises the entire fatigue load, the pay per unit power generation, and a difference between a consumed fatigue load and an average value of consumed fatigue loads of the plurality of wind turbines, and wherein the consumed fatigue load is a sum of the historical equivalent fatigue load, the equivalent fatigue load and the entire fatigue load; and
select, based on the reference indexes, one of the set of preset power values as the optimal power value, such that the reference indexes corresponding to the optimal power value are all less than the respective reference indexes corresponding to at least a part of other preset power values among the set of preset power values.

16. The apparatus for controlling power according to claim 15, wherein the processor is further configured to:
determine an index product and an index sum of the reference indexes corresponding to each of the preset power values, and determine a ratio of the index product to the index sum as a comprehensive index corresponding to the preset power value; and
determine a preset power value with a minimum comprehensive index as the optimal power value, and
the reference indexes each further comprises a sum of the consumed fatigue loads of the plurality of wind turbines.

17. The apparatus for controlling power according to claim 14, wherein the set of preset power values comprises a plurality of preset power values which are obtained from a full power value of the target wind turbine subtracted gradually by a preset value, wherein a minimum one of the set of preset power values is greater than or equal to 0.

18. The apparatus for controlling power according to claim 12, wherein the entire fatigue load is obtained based on a wind resource parameter at the current moment, and the wind resource parameter comprises statistical values of turbulence intensity under a plurality of respective wind speeds, probability densities of the plurality of respective wind speeds, and probability densities of a plurality of wind directions corresponding to the plurality of respective wind speeds, and wherein the entire fatigue load is obtained by accumulating the statistical values of turbulence intensity with consideration of the probability densities of the plurality of respective wind speeds and the probability densities of a plurality of wind directions corresponding to the plurality of respective wind speeds.

19. The apparatus for controlling power according to claim 18, wherein the statistical value of each turbulence intensity is a standard deviation of turbulence intensity, and wherein the entire fatigue load is obtained by:

determining, for each of the wind turbines and for each of the wind speeds, a product of an m-th power of a standard deviation of turbulence intensity, a probability density of the wind speed, and a probability density of a corresponding wind direction, and determining a sum of the products as a reference load, wherein m is a material Wolter coefficient of the wind turbine; and determining a (1/m)-th power of the reference load as the entire fatigue load of the wind turbine.

20. The apparatus for controlling power according to claim 12, wherein the processor is further configured to:

determine, during the limited power cycle, a sum of the historical equivalent fatigue load and the equivalent fatigue load as an updated historical equivalent fatigue load;

repeat the step of acquiring the entire fatigue load, the equivalent fatigue load of the target component and the pay per unit power generation of each of the plurality of wind turbines at a current moment to update the optimal power value.

* * * * *